(12) United States Patent
Blum (10) Patent No.: US 7,853,199 B2
(45) Date of Patent: Dec. 14, 2010

(54) ALARM SIGNALING WITH HYBRID DATA AND TWO-WAY VOICE CHANNEL

(75) Inventor: William R. Blum, Huntington Station, NY (US)

(73) Assignee: Honeywell International Inc., Morristown, NJ (US)

( * ) Notice: Subject to any disclaimer, the term of this patent is extended or adjusted under 35 U.S.C. 154(b) by 775 days.

(21) Appl. No.: 11/834,414

(22) Filed: Aug. 6, 2007

(65) Prior Publication Data

US 2009/0017751 A1 Jan. 15, 2009

Related U.S. Application Data

(60) Provisional application No. 60/948,932, filed on Jul. 10, 2007.

(51) Int. Cl.
*H04H 20/71* (2008.01)
(52) U.S. Cl. .................. 455/3.05; 455/412.2; 455/416; 455/419; 455/422.1; 370/260; 379/39; 379/45; 379/51; 379/102.02; 340/509; 340/539.16
(58) Field of Classification Search .............. 455/3.05, 455/3.03, 412.2, 414.1, 415, 416, 417, 418, 455/419, 420, 422.1; 370/260; 379/37–45, 379/49, 51, 102.02, 102.03, 111.01; 340/506, 340/539.11, 539.16, 539.17, 539.18
See application file for complete search history.

(56) References Cited

U.S. PATENT DOCUMENTS

| 4,253,157 | A | * | 2/1981 | Kirschner et al. .................. 1/1 |
| 5,568,121 | A | | 10/1996 | Lamensdorf |
| 5,568,535 | A | * | 10/1996 | Sheffer et al. .................. 379/39 |
| 5,815,550 | A | * | 9/1998 | Miller .......................... 379/37 |
| 6,040,770 | A | * | 3/2000 | Britton .................. 340/539.24 |
| 6,542,072 | B1 | | 4/2003 | Yang |
| 7,391,315 | B2 | * | 6/2008 | Friar .......................... 340/506 |
| 2001/0012343 | A1 | | 8/2001 | Dal Molin |
| 2004/0001579 | A1 | | 1/2004 | Feinberg et al. |
| 2004/0086093 | A1 | | 5/2004 | Schranz |
| 2006/0049936 | A1 | | 3/2006 | Collins Jr. et al. |
| 2007/0086578 | A1 | * | 4/2007 | Hansen et al. ................. 379/45 |

FOREIGN PATENT DOCUMENTS

| DE | 4444653 A1 | 6/1996 |
| WO | WO9858494 A2 | 12/1998 |
| WO | WO0100085 A1 | 1/2001 |
| WO | WO2006137099 A2 | 4/2006 |

\* cited by examiner

*Primary Examiner*—Matthew D Anderson
*Assistant Examiner*—Shaima Q Aminzay
(74) *Attorney, Agent, or Firm*—Husch Blackwell Welsh Katz (57) ABSTRACT

A method is presented for providing alarm notification and two-way voice communication for a hybrid data/voice system by sending an alarm from a communication device to a central station receiver via a data transmission method, associating the alarm with a telephone number operating with a voice transmission method, and initiating the two-way voice communication between the communication device and a voice receiver. In one embodiment, associating includes selecting a line number and telephone number, verifying the number's availability, and if the number is available, sending it to the communication device. In another embodiment, associating includes forwarding the alarm from the alarm forwarding service to a receiver, sending a telephone number to the communication device, contacting the telephone number from the communication device, and using a voice transmission method to create a three-way call among the alarm forwarding service, the communication device and the central station.

14 Claims, 6 Drawing Sheets

ALARM SIGNALING WITH HYBRID DATA AND TWO-WAY VOICE CHANNEL

CROSS REFERENCE TO RELATED APPLICATION

The present invention claims the benefit of U.S. provisional patent application 60/948,932 filed Jul. 10, 2007, the entire content and disclosure of which is incorporated herein by reference.

BACKGROUND OF THE INVENTION

Alarm and security systems generally signal alarm conditions by contacting a central station upon the occurrence of a predetermined condition such as an intrusion or break-in on a premise under surveillance. Alarm signals are typically digital data signals that are sent over a telephone line from the premises to the central station where actions may be taken such as dispatching local police. In certain cases, in response to an alarm signal, it is desired to initiate a two-way voice telephone call to confirm if a request for police dispatch or other event(s) should be initiated. Hence, if an alarm signal is transmitted from a home to the central station, an operator at the central station may attempt to initiate a voice conversation with the homeowner to ascertain if there is genuinely a trouble condition. The operator would request that the homeowner pronounce a code confirmation into a two-way speakerphone panel located in the home. If the homeowner does not respond with the expected code, or if other problems are apparent through the voice connection, then the operator may make the decision to initiate an event, such as to inform and/or dispatch the local police, private security personnel, firefighters, or others. This two-way voice feature helps reduce false alarms and increases speed of response, among other things.

While this type of service is employed with POTS (plain old telephone system) lines, the use of cellular telephone systems causes new problems in this area, because the alarm signals that must be sent as digital data signals are not successfully transmitted over the voice channel of the cellular network due, for example, to the CODECs (coder-decoders) used by the cellular network. That is, while digitized voice signals can be acceptably transmitted over a cellular network, the digital data used for the alarm signal prior to the two-way voice conversation is not transmitted with acceptable fidelity. Hence an alarm signal must be transmitted over a data channel or data connection of a cellular network. Thus, the techniques employed by traditional systems, such as POTS, to associate the digital data alarm signals with the resulting two-way voice telephone call do not successfully operate with the current cellular networks. Consequently, a system and/or method that associates an incoming alarm signal with a voice channel or telephone line over which voice communication can be performed is needed.

SUMMARY OF THE INVENTION

The present invention advantageously provides a method for providing alarm notification and two-way voice communication for a hybrid data/voice system, comprising sending an alarm notification from a remote communication device to a receiver at a central station via a data transmission method, associating the alarm notification with a central station telephone number which operates with a voice transmission method, and initiating the two-way voice communication between the remote communication device and a central station voice receiver using a voice transmission method. The association between the alarm notification data and the central station telephone number is done by selecting a line number having a corresponding telephone number, verifying the availability of the line number, and sending the corresponding telephone number and the acknowledgement of the alarm notification to the remote communication device, if the line number is available.

In another embodiment, the invention advantageously provides a method for alarm notification and two-way voice communication for a service based hybrid data/voice system, comprising sending an alarm notification from a remote communication device to an alarm forwarding service using a data transmission method, associating the alarm notification with a telephone number at the central station, and initiating two-way voice communication between the remote communication device and the central station voice receiver. The association between the alarm notification data and the central station telephone number is done by forwarding the alarm notification from the alarm forwarding service to a central station receiver, using the data transmission method to send a central station telephone number and acknowledgement of the alarm notification to the remote communication device from the alarm forwarding service, contacting the central station telephone number from the remote communication device, and using a voice transmission method to create a three-way call among the alarm forwarding service, the remote communication device and the central station voice receiver.

BRIEF DESCRIPTION OF THE DRAWING

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

The foregoing and other objects, aspects, features, advantages of the invention will become more apparent from the following description and from the claims.

DISCLOSURE OF THE INVENTION

Figure 1:
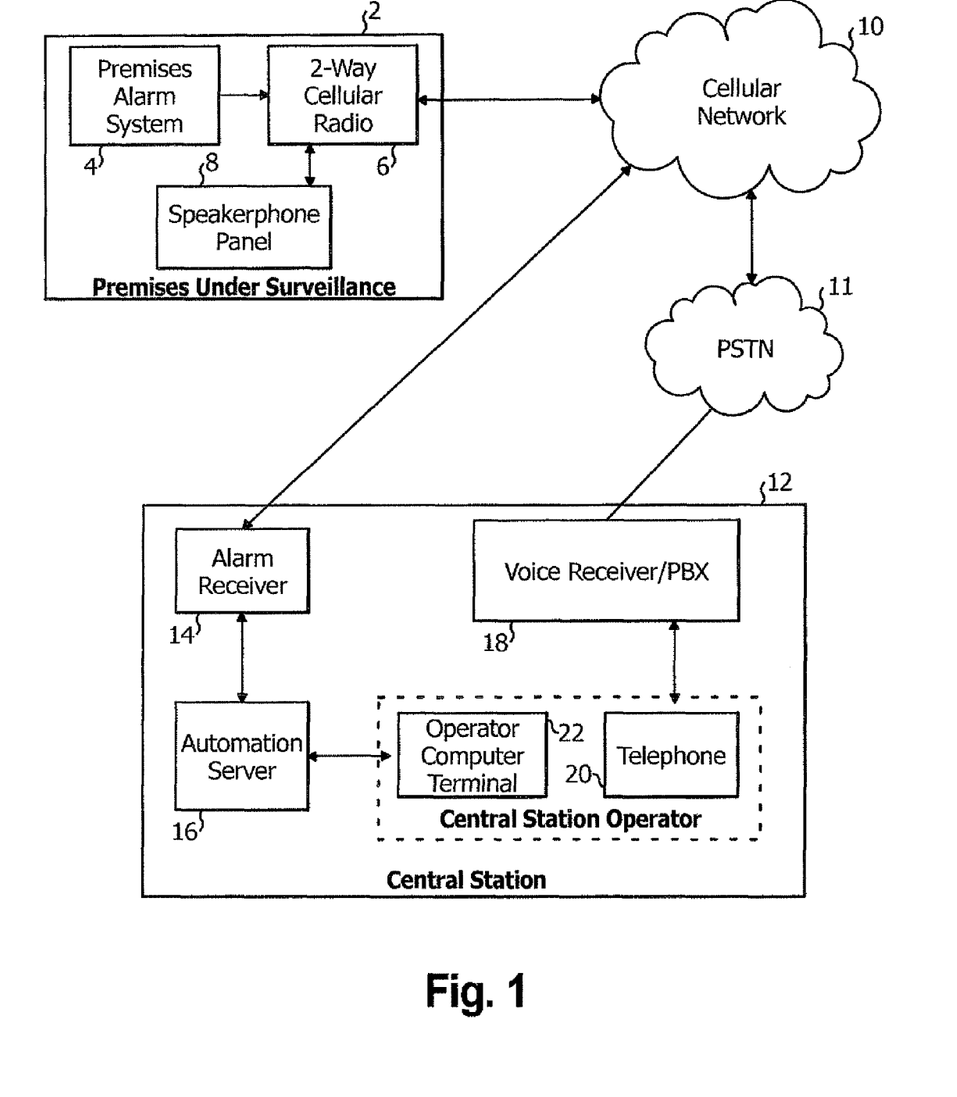
FIG. 1 is a block diagram of the first embodiment of the present invention.
Figure 2:
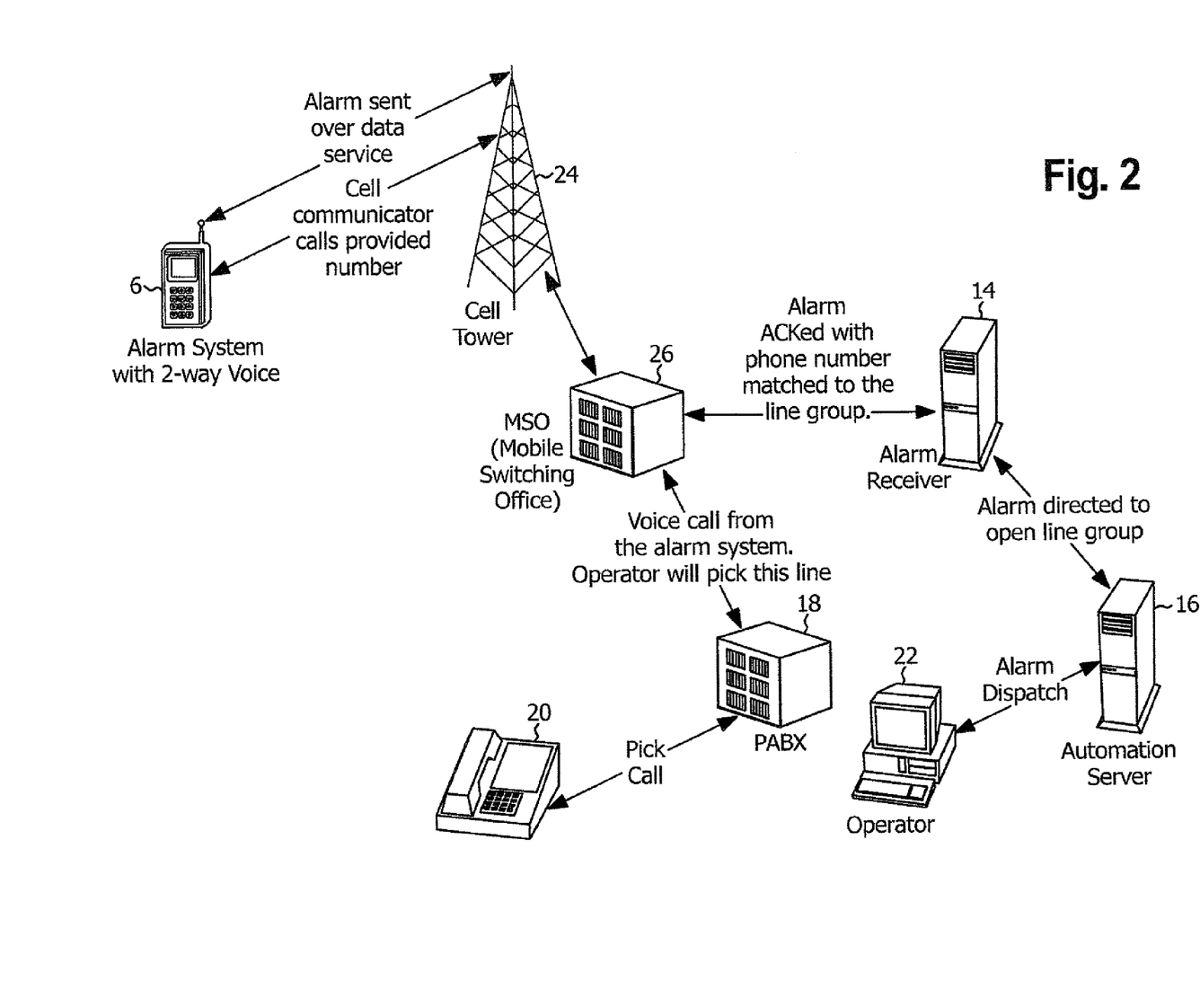
FIG. 2 is a schematic illustration of the first embodiment of the present invention.
Figure 3:
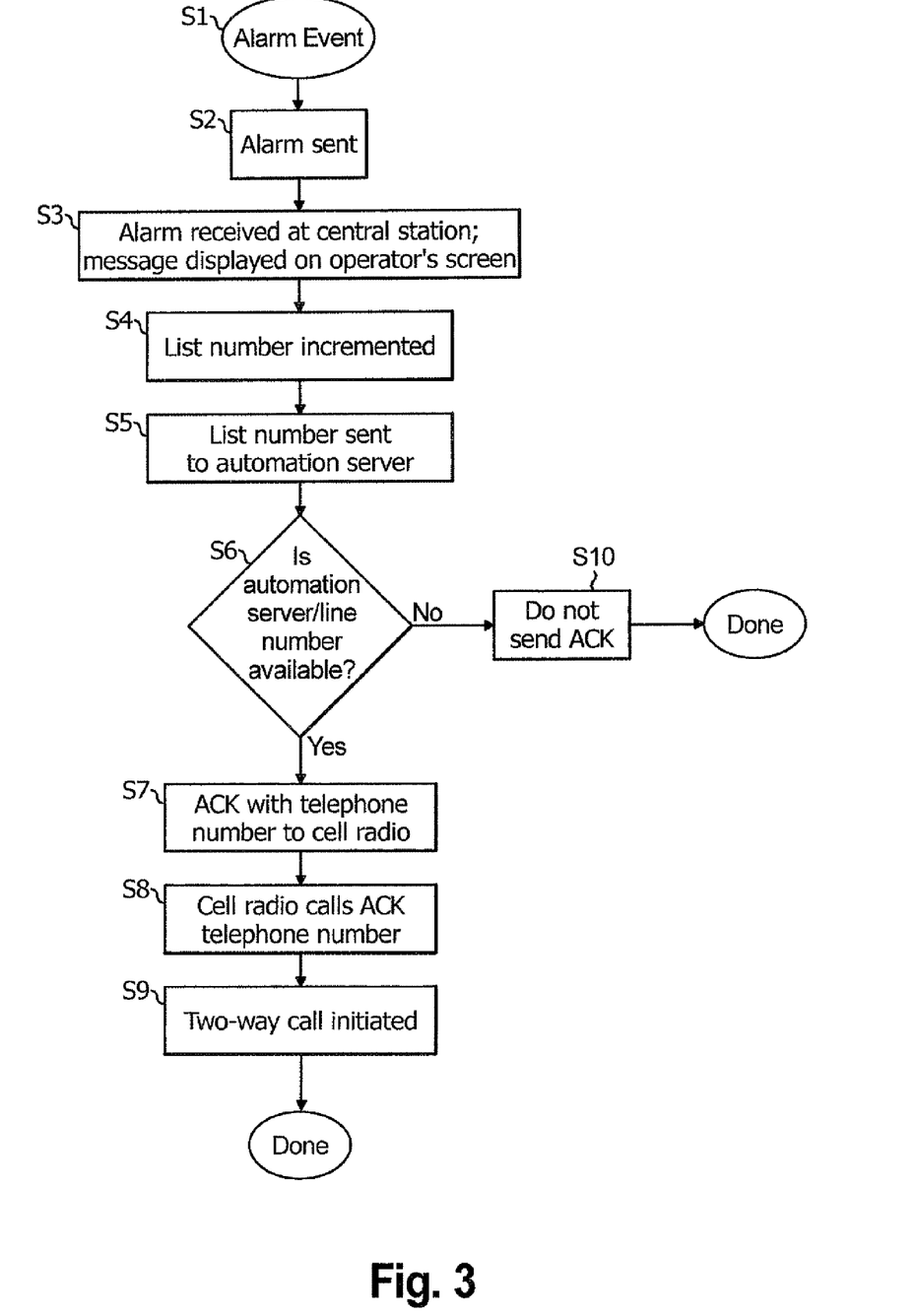
FIG. 3 is a flowchart of the steps carried out by the first embodiment of the present invention.

The first embodiment of the invention is shown in the block diagram of FIG. 1 and the schematic illustration of FIG. 2. The procedures of this first embodiment are shown in the flowchart of FIG. 3. The first embodiment of this invention includes a building 2, that is the premises under surveillance, which includes an alarm system 4, a 2-way remote communication device such as a cellular radio 6, and a speakerphone panel 8. When an alarm event is detected by the alarm system 4 (such as a door opening when the alarm system 4 is armed and the disarm code is not entered on a security system keypad within a predetermined time), then an alarm signal is generated as is well known in the art. This digital alarm signal along with alarm data will be transmitted by the cellular radio 6 via a digital data service implemented by the cellular network 10, such as SMS (short message service or text message), GPRS (General Packet Radio Service), 1XRTT, or any other digital data transmission service or data communication method, including internet protocol (IP). The cellular network 10 can include a cell tower 24 and mobile switching office 26, as shown in FIG. 2. The transmission can be over via the cellular network 10 and the PSTN (public switched telephone network) 11. Optionally, the data is transmitted using internet protocol, and the cellular radio voice connection is replaced by a VOIP-enabled communication device. In this first embodiment, the digital alarm signal and alarm data will be referred to as a text message, but it is understood that any digital data protocol may be used. Similarly, it is understood that cellular network 10 can be any data or voice transmission or communication method.

Thus, the alarm text message, e.g., a text message containing the digital alarm signal and alarm data is transmitted to an alarm signal server or alarm receiver 14 located at a central station 12. The cellular radio 6 at the home owner's or alarm system user's premises 2 is preprogrammed with the destination telephone number of the alarm signal server 14 so that each time an alarm text message needs to be sent to the central station 12, the cellular radio 6 will do so, thus commencing the alarm process. The alarm signal server 14 will then send an acknowledgement message (ACK) of the alarm text message back to the cellular radio 6 via the cellular network 10. The ACK signal or message will contain a central station telephone number selected as described below. The cellular radio 6 will receive this ACK signal, and then use the embedded central station telephone number to initiate a cellular voice call to the embedded telephone number. The voice call can be transmitted via a voice communication or traditional circuit switched method, such as POTS, VOIP, cellular voice, etc. In addition, the alarm signal server 14 will hand off this event to the automation server 16.

The voice call from the cellular radio 6 to the telephone number embedded in the ACK signal will be directed to the voice receiver or PBX 18 at the central station. The PBX 18 will route the call and connect to a telephone device 20 operated by an operator at the central station. In addition, the digital alarm data that was originally sent via the alarm text message is forwarded to an operator's computer terminal 22, which is operated by the operator who also receives the telephone call from the premises 2. Thus, the operator will have the alarm condition from the alarm text message appear on his or her display terminal 22 screen and will also receive the voice call being placed by the cellular radio 6 from the premises 2. Upon answering the voice call, the operator may begin speaking with a person at the premises 2 to determine if conditions are safe or if security personnel should be dispatched. Note that the telephone functions may be integrated with the computer terminal 22 as is well known in the art.

The central station telephone number incorporated in the ACK signal corresponds to a line or line number at the central station. The alarm signal server 14 determines the telephone number by finding a line that is currently available, i.e. not in use, and selecting the telephone number that corresponds to this available line. Typically, a group or block of telephone numbers is available at the central station 12. For example, a central station 12 may operate sixteen physical telephone numbers to serve hundreds or even thousands of customers. In the central station 12, each telephone number corresponds to a line having a line number. In one embodiment, there may be a rolling selection process among the available lines, so that the alarm receiver 14 chooses the next available line and its telephone number is sent to the premises 2 via the ACK signal or message. The selection process may be performed using an algorithm that can be implemented as computer software.

The procedure for the first embodiment is shown in FIG. 3, in accordance with the system shown in FIGS. 1 and 2. Initially, in step S1, an alarm event occurs, and, in step S2, the cellular radio 6 sends the alarm text message, using a data transmission method. The alarm signal server or receiver 14 receives the alarm in step S3. Next, in steps S4-S9, the telephone number to be embedded within the ACK signal is chosen by the alarm receiver 14. In step S4, the alarm receiver 14 performs a selection process and selects the "next line number" by incrementing the line number within a predetermined range. The line number, which can be a two digit or four digit number, is generally incremented by increasing its value by one. Other selection processes can be used. Each line number has a corresponding telephone number.

The availability of the Automation Server and transfer of the alarm data takes place in step S5. The alarm signal server 14 sends the alarm signal to the automation system or automation server 16 using the line number. If the alarm signal is successfully received by the automation system 16 (S6=YES), in step S7, the alarm signal server 14 acknowledges the alarm, and sends the ACK signal back to the cellular radio 6, using a data transmission method. This ACK signal includes the telephone number that corresponds to the line number. In step S8, the cellular radio 6 calls the telephone number provided in the ACK, using a voice communication or transmission method. The operator picks up the line provided with the alarm message or dispatch. This line corresponds to the telephone number in the ACK message. Thus, the operator answers the call from the cellular radio 6 in step S9, initiating a two-way voice conversation and completing the procedure. At the same time, the alarm message is displayed on the operator's screen.

If the alarm signal is not successfully received (S6=NO), the alarm signal server 14 does not send an acknowledgement to the cellular radio 6 and the procedure terminates. In most cases, the cellular radio 6 will send the alarm text message again.

Figure 4:
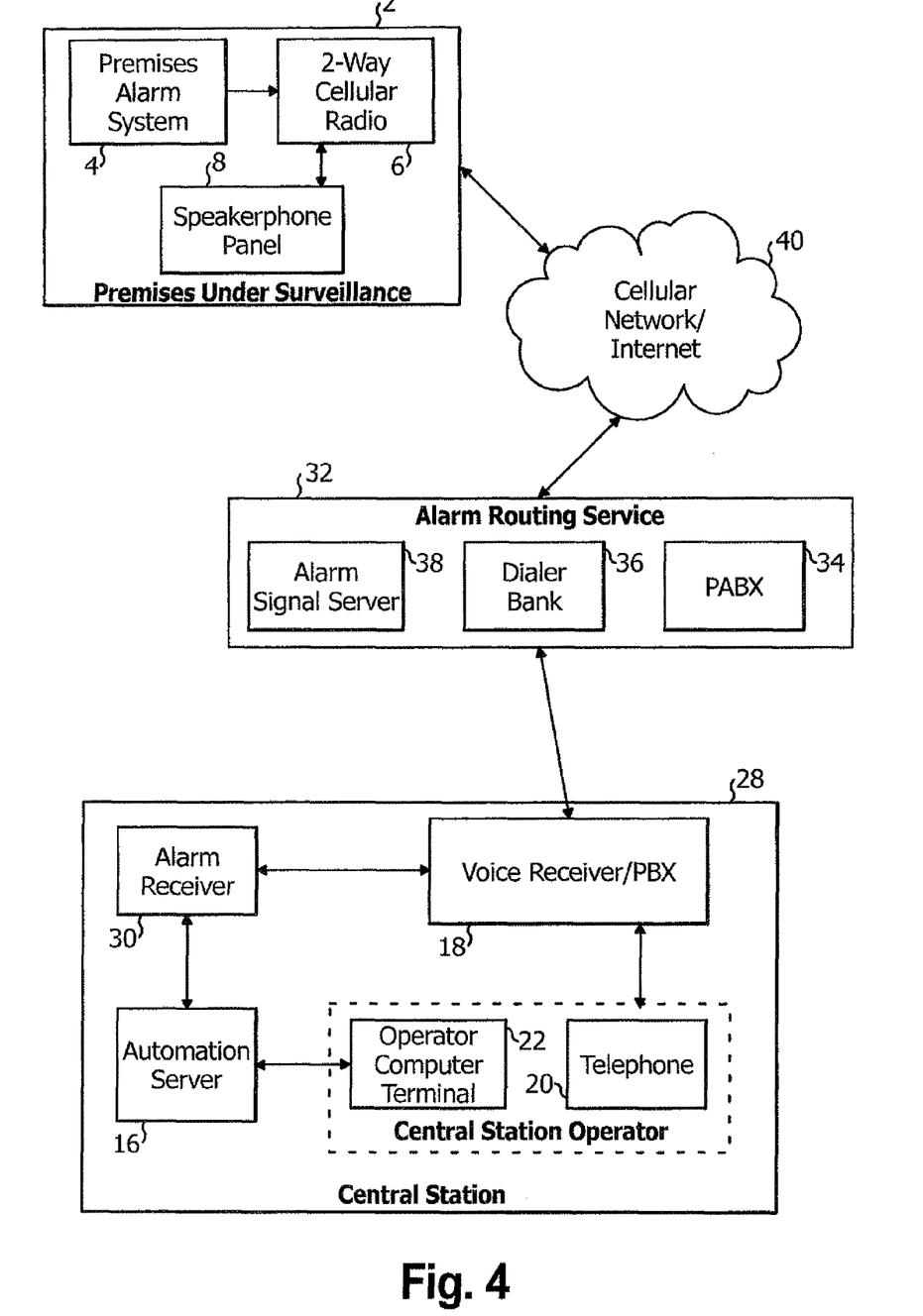
FIG. 4 is a block diagram of the second embodiment of the present invention.
Figure 5:
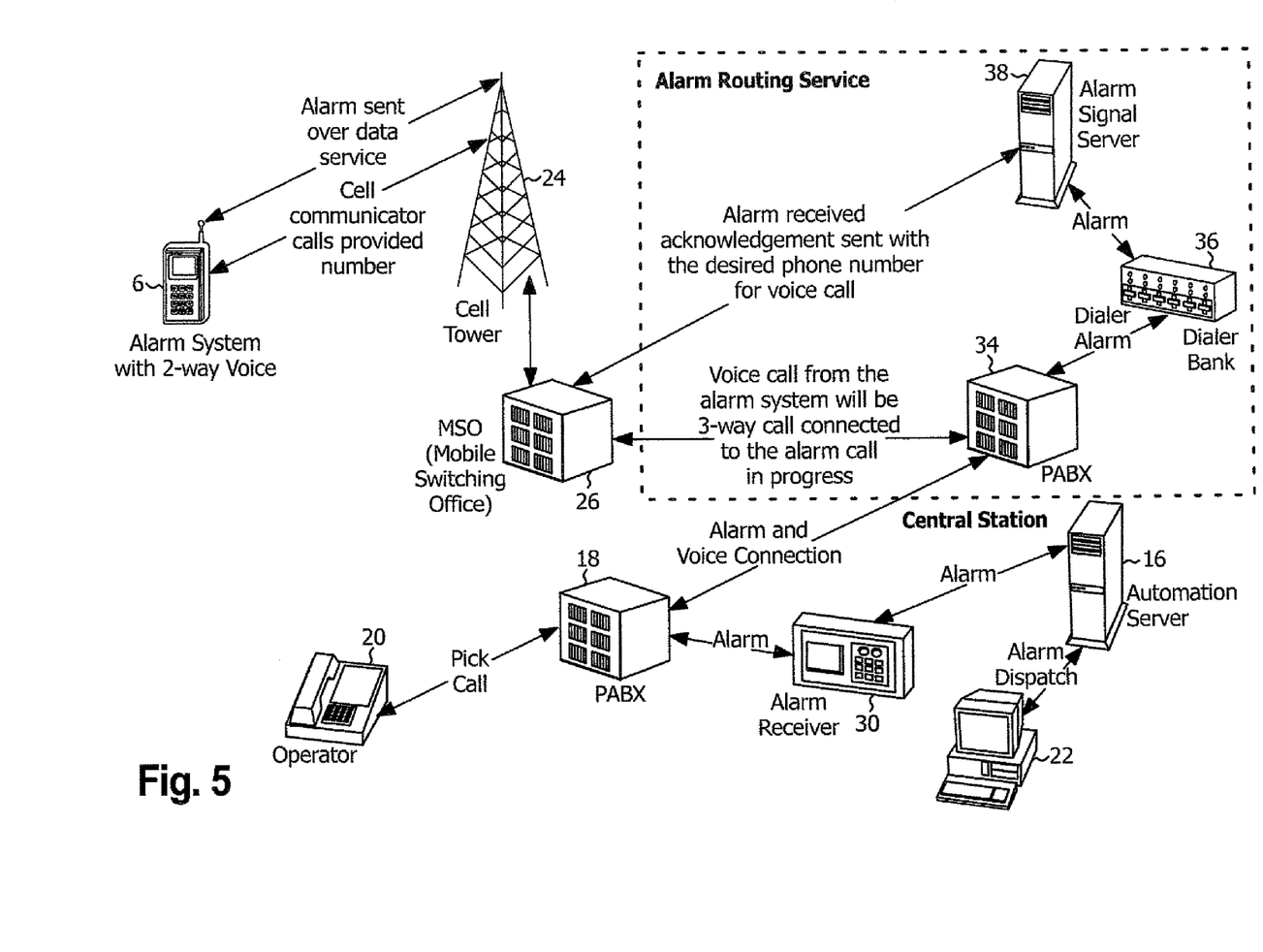
FIG. 5 is a schematic illustration of the second embodiment of the present invention.
Figure 6:
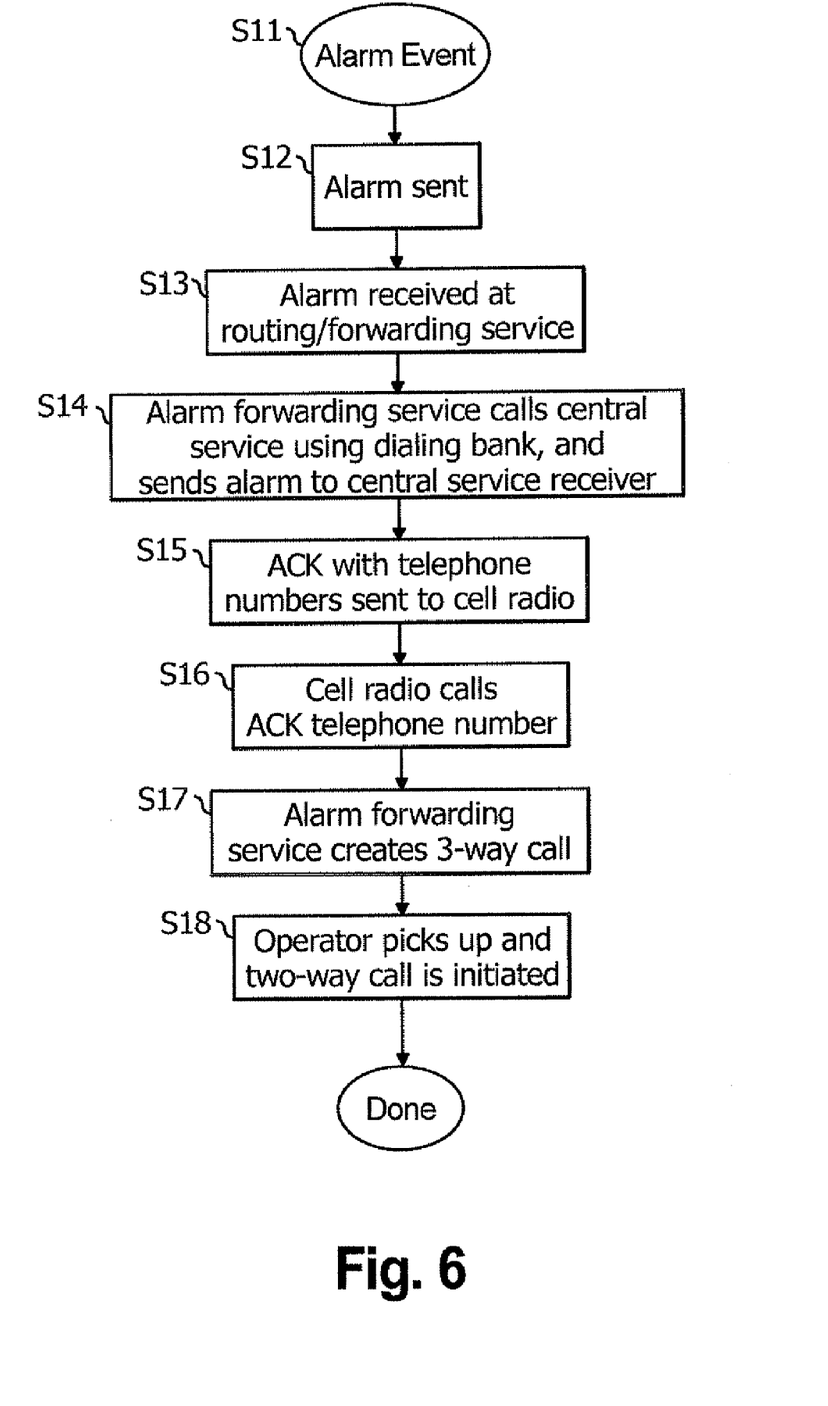
FIG. 6 is a flowchart of the steps carried out by the second embodiment of the present invention.

The second embodiment of the invention is shown in the block diagram of FIG. 4 and the schematic illustration of FIG. 5, and the procedures of this second embodiment are shown in the flowchart of FIG. 6.

The second embodiment of this invention also includes a building 2, which includes an alarm system 4, a 2-way cellular radio 6, and a speakerphone panel 8, and a central station 28. However, the central station 28 of the second embodiment includes not only an automated server 16, a PBX 18, and a central station operator having an operator computer terminal 22 and a telephone device 20, but also includes an alarm receiver 30. The second embodiment further includes an alarm routing service 32 having an alarm signal server 38, a PABX 34 and a dialer bank 36.

As in the first embodiment, when an alarm event is detected by the alarm system 4, an alarm signal is generated as is well known in the art. This digital alarm signal will be transmitted by the cellular radio 6 via a digital data service, such as SMS, GPRS, 1XRTT, implemented by the cellular network having a cell tower 24, or any other digital data transmission service. In one embodiment, a digital data service implemented via internet protocol (IP) can be used. In this embodiment, a VOIP-enabled communication device replaces the cellular radio 6 for the voice connection. As with the first embodiment, the transmitted alarm signal will be referred to as a text message, but it is understood that any digital data protocol may be used. Also as above, cellular network/IP 40 means any data or voice transmission service or communication method.

Accordingly, a text message containing the digital alarm data is transmitted via the cellular network/IP 40 to an alarm signal server 38 located at the alarm routing service 32. As with the first embodiment, the cellular radio 6 at the premises 2 is preprogrammed with the destination telephone number of the alarm signal server 38. However, in the second embodiment, each time the alarm process is commenced, an alarm text message is sent to the central station 28 by the cellular radio 6 through the alarm routing service 32. After receiving the alarm text message, the alarm signal server 38 at the alarm routing service 32 will then send an acknowledgement message (ACK) of the alarm text message back to the cellular radio 6 via the cellular network/IP 40. The ACK signal will contain a central station telephone number selected by the PABX 34 in the alarm routing service 32. The cellular radio 6 will receive this ACK signal, and will then initiate a cellular voice call or VOIP call to the central station telephone number embedded in the ACK signal, using a voice transmission method. In addition, the alarm signal server 38 will notify the dialer bank 36 which will contact the PABX 34 to connect to the PABX 18 at the central station 28 further connecting the call to the alarm receiver 30.

Hence, the voice call from the cellular radio 6 to the telephone number embedded in the ACK signal will be directed to the PABX 34 at the Alarm Routing service 32. The PABX 34 will conference the voice call into the open alarm signaling call placed by the dialer bank 36. The PBX 18 and Automation Server 16 will route the voice call to the central station operator telephone 20.

The PBX 18 of the central server 28 connects to a telephone device 20 operated by an operator at the central station 28. In addition, the alarm data that was originally sent via the alarm text message is forwarded to an operator computer terminal 22, which is operated by the operator who receives the telephone call from the premises 2. Thus, the operator will have the alarm data or condition appear on his or her display terminal 22 screen and will also receive the voice call being placed by the cellular radio 6 from the premises 2. Upon answering the voice call, the operator may begin speaking with a person at the premises 2 to determine if conditions are safe, or if security or other personnel should be dispatched. Note that, as with the first embodiment, the telephone functions may be integrated with the computer terminal 22 as is well known in the art.

The procedure for the second embodiment is shown in FIG. 6, in accordance with the system shown in FIGS. 4 and 5. Initially, in step S11, an alarm event occurs, and the cellular radio 6 sends the alarm message via a digital data service, such as a cellular network/IP 40, in step S12. The alarm signal server 38 of the alarm routing service or alarm forwarding service 32 receives the alarm in step S13. In step S14, the alarm forwarding service 32 calls the central station 28 using a circuit switched re-dialer or dialer bank 36 and sends the alarm to the central station alarm receiver 30. The alarm can be converted from digital data to standard voice communication protocol in the dialer bank 36. In step S15, the telephone number to be embedded with the ACK signal is obtained from the PABX 34 and forwarded in the ACK signal to the cellular radio 6. The cellular radio 6 calls the embedded telephone number in step S16. In step S17, the alarm forwarding service 32 creates a three-way call among the re-dialer 36, the cellular radio 6 and the central station 28, using voice communication protocol or a voice transmission method. Alternatively other voice transmission methods such as VOIP could be used in place of cellular radio. In step S18, the operator answers the line provided with the alarm dispatch, the re-dialer 36 disconnects, and the two-way call is initiated. Hence, the procedure is completed.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for providing alarm notification and two-way voice communication for a hybrid data/voice system, said method comprising:

sending an alarm notification from a remote communication device to a central station using a data transmission method;

associating the alarm notification with a central station telephone number operable with a voice transmission method, said step of associating comprising the steps of:

the central station selecting a line number from a plurality of line numbers having a corresponding central station telephone number;

the central station verifying the availability of the selected line number;

the central station sending, using the data transmission method, an acknowledgement message of the alarm notification to the remote communication device, when the line number is available, the acknowledgement message containing the central station telephone number corresponding to the line number selected by the central station; and initiating a two-way voice communication between said remote communication device and a the central station using a voice transmission method.

2. The method according to claim 1, wherein said data transmission method is one of cellular transmission protocol and internet protocol.

3. The method according to claim 1, wherein said voice transmission method is one of cellular transmission protocol and internet protocol.

4. The method according to claim 1, wherein said line number is an integer.

5. The method according to claim 4, wherein said step of selecting a line number comprises incrementing said line number.

6. The method according to claim 1, wherein said step of verifying comprises:

sending a signal to an automated server; and determining if the automated server receives the signal.

7. The method according to claim 1, wherein the remote communication device is a cellular radio.

8. The method according to claim 1, wherein the remote communication device is an internet enabled communication device.

9. A method for providing alarm notification and two-way voice communication for a service based hybrid data/voice system, said method comprising:

sending an alarm notification from a remote communication device to an alarm routing service using a data transmission method;

associating the alarm notification with a central station telephone number operable with a voice transmission method, said step of associating comprising the steps of:

forwarding the alarm notification from the alarm routing service to a central station receiver;

sending, using the data transmission method, the central station telephone number and an acknowledgement of the alarm notification to the remote communication device from the alarm routing service;

contacting the central station telephone number from the remote communication device; and creating a three-way call among the alarm routing service, the remote communication device and a central station voice receiver using a voice transmission method; and initiating the two-way voice communication between the remote communication device and the central station voice receiver using the voice transmission method.

10. The method according to claim 9, wherein said data transmission method is one of cellular transmission protocol and internet protocol.

11. The method according to claim 9, wherein said voice transmission method is one of cellular transmission protocol and internet protocol.

12. The method according to claim 9, wherein said remote communication device is a cellular radio.

13. The method according to claim 9, wherein said remote communication device is an internet enabled communication device.

14. The method according to claim 9, wherein the alarm routing service comprises a dialer bank operable to obtain the telephone number.

* * * * *